F. F. HEPLER.
DRILL CHUCK.
APPLICATION FILED DEC. 21, 1909.
990,812.
Patented Apr. 25, 1911.
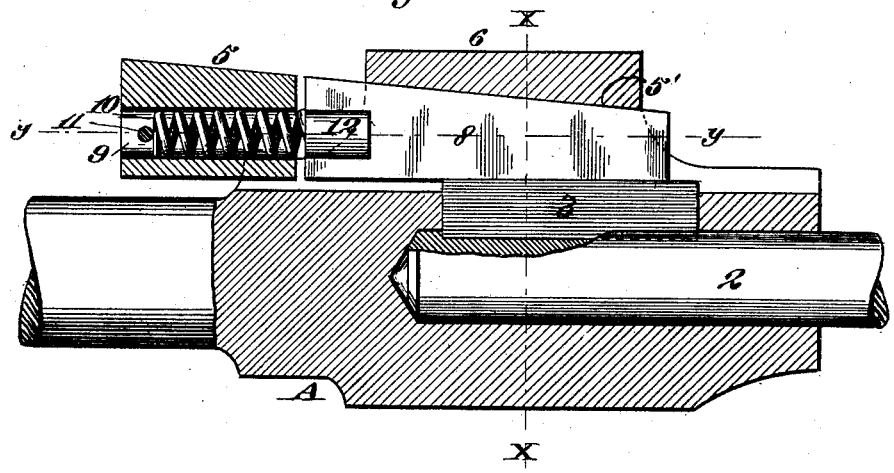
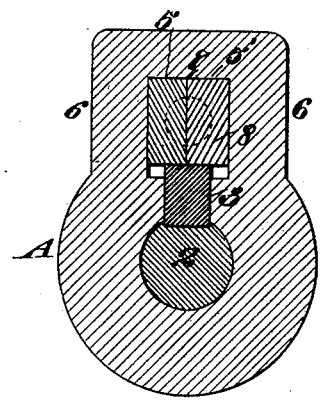
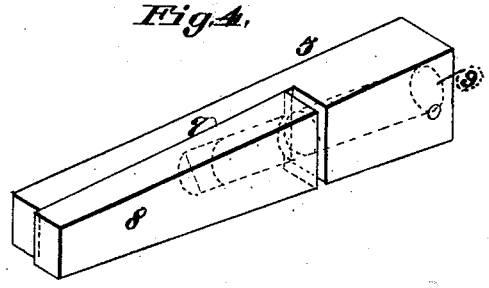
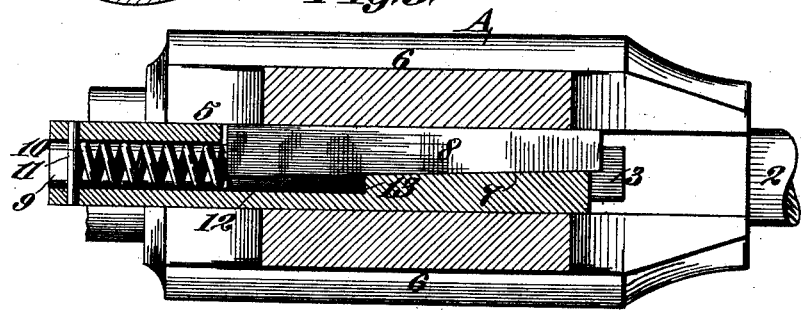
Witnesses:
Charles Pickles
F. S. Maynard.
Inventor:
Fay F. Hepler,
By G. H. Strong.
Attys

UNITED STATES PATENT OFFICE.

FAY F. HEPLER, OF KIMBERLY, CALIFORNIA.

DRILL-CHUCK.

990,812.   Specification of Letters Patent.   Patented Apr. 25, 1911.

Application filed December 21, 1909. Serial No. 534,290.

*To all whom it may concern:*

Be it known that I, FAY F. HEPLER, a citizen of the United States, residing at Kimberly, in the county of Shasta and State of California, have invented new and useful Improvements in Drill-Chucks, of which the following is a specification.

This invention relates to drill chucks, and pertains especially to a chuck for use on rock-drills and the like.

The object of the invention is to provide a simple, practical drill chuck, which will hold the drill in the chuck in a positive and effective manner and which will be easy to operate and will facilitate the drilling operation.

A further object is to provide a drill chuck in which a drill shank may be easily and quickly inserted and securely held against movement by accident, but which can be easily removed when desired.

The invention consists of the parts and the combination and construction of parts as hereinafter more fully described and claimed, reference being had to the accompanying drawings, in which—

Figure 1 is a vertical section of the invention. Fig. 2 is a cross-section on the line X—X, Fig. 1. Fig. 3 is a sectional view on the line Y—Y, Fig. 1. Fig. 4 is a perspective of the compound locking key.

The chuck head is represented at A and is provided with a suitable central bore which is adapted to receive the shank of a drill 2. A gib 3 is inserted in a slot in the chuck head and is designed to bear against and retain the drill shank 2 in the head through the medium of a compound tapered key 5, as later described. This tapered key 5 is inserted in a correspondingly tapered keyway 5', formed in an extended portion or boss 6 of the chuck head A. A slideway 7 is formed in one side of the key 5 and slopes backward and inward from its forward end to its termination about midway of the key 5. A retainer-key 8, tapered to conform to the slideway 7, is adapted to be wedged between the side of the keyway 5' and the key 5, to prevent the latter from working loose when the drill is in operation. A hole 9 is drilled in the wide end of the key 5 leading to the slideway 7 to house a spring 10 which acts normally to press the key 8 forward into binding position.

The straight side of the retainer-key 8 contacts the side of the keyway 5', and the tapered side bears against the correspondingly tapered side of the slideway 7 in the key 5, Fig. 3.

The spring 10 bears against the head of the retainer-key 8, and is held under compression by suitable means, as the stop pin 11. A lug 12 is formed on the inner side of the retainer-key 8 for the purpose of presenting a broad seat and also to hold the key 8 from slipping up or down in the keyway 5'. A groove or channel 13 is provided in the tapered key 5 in which the lug 12 is adapted to slide when the retainer-key 8 is driven forward.

When the chuck is ready for operation, all the parts of the chuck are together in their respective places, and they are there to stay and are ready to do their work as soon as the drill-shank is placed in the chuck-head.

To operate any rock drill with my chuck attached is as follows: Place the shank of the drill in the chuck, then push the key 5 forward as far as possible with the hand, and then start the machine, and that is all there is to the tightening of the keys 5 and 8. For the first stroke that the drill-bit hits the rock, the jar of the stroke sets the key 5 up tight on the gib and drill-shank, and also sets key 8 and wedges it tightly between the key 5 and the keyway 5' and so holds the key 5 from coming backward. To release the two keys 5 and 8 it is only necessary to hit the key 8 on the front point with a hammer. The hammer will start the key 8 and key 5 will catch enough of the stroke to drive it back also.

The spring 10 is for the purpose of holding the key 8 in its place when the drill or machine is not in motion; when the machine is in motion key 8 is driven forward by the forward stroke of the piston as explained above.

One of the main features of this invention is the time saved when changing drills. Another feature is the retaining device (key 8) which retains the key 5 at every degree of pressure that it transmits to the drill-shank through the gib.

Having thus described my invention, what I claim and desire to secure by Letters-Patent, is—

1. In a drill chuck, the combination of a chuck head having a lengthwise extending key-way, and a bore to receive a drill shank, said head having a slot intersecting said bore and key-way, a gib in the slot to lock against the shank, and a two-part gib-key fitting the lengthwise extending key-way in the chuck head, said key being tapered in the direction of its length and having its parts placed side by side with the under side of the several parts of the key directly engaging the gib and corresponding opposite tapered surfaces engaging the inner wall of the key-way, the contacting surfaces of the two-part key being longitudinally tapered and one of said parts being movable on the other and serving as a locking means for coacting with the chuck head to lock the key in place.

2. In a drill chuck, the combination of a chuck head having a bore to receive a drill shank, said head having a slot intersecting said bore, said head having a lengthwise extending key-way connecting with the slot, a gib in the slot to lock against the drill shank, and a gib-key in said key-way tapered in the direction of its length and formed of two substantially similar parts placed side by side with the under side of said parts arranged in the same plane and directly engaging one side of the gib and the corresponding opposite parts normally arranged substantially in the same plane and engaging the inner wall of the key-way the contacting surfaces of the two parts of the key being tapered in the direction of their length, and one of the parts of the gib-key being slidable upon the other part.

3. The combination with a chuck head having a bore to receive a drill shank and having a tapered key-way with a slot connecting the same with said bore, and a gib in said slot to engage the drill shank, of a gib-key divided into two substantially similar parts placed side by side with the lower edges in the same plane and each engaging one side of the gib, the opposite corresponding portions of the two parts of the key being similarly inclined and adapted to engage a corresponding wall of the key-way and the portions of the key which contact with each other being tapered longitudinally.

4. In a drill chuck, a gib-key having a main portion and a lengthwise extending part which is tapered and is slidable upon the main portion, said main portion having a housing, and a spring in the housing and acting against the slidable member of the key.

5. The combination in a drill chuck, of a chuck head adapted to receive a drill shank, a longitudinally extending locking key therefor, said locking key being tapered and said chuck head having a corresponding taper in which the key fits, the said key having, also, a lengthwise extending tapered slide-way, a lengthwise tapered wedge member fitting said slide-way and co-acting with the walls of said key-way to lock said key in place, and a spring housed in the key and acting on said wedge member.

In testimony whereof I have hereunto set my hand in the presence of two subscribing witnesses.

FAY F. HEPLER.

Witnesses:
HENRY C. CLAY,
ELLIS E. BEAMAN.